United States Patent
Bläsing

(10) Patent No.: US 6,552,330 B2
(45) Date of Patent: Apr. 22, 2003

(54) OPTOELECTRONIC ANGLE OF ROTATION SENSOR

(75) Inventor: Frank Bläsing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/097,897

(22) Filed: Mar. 13, 2002

(65) Prior Publication Data

US 2002/0088934 A1 Jul. 11, 2002

Related U.S. Application Data

(63) Continuation of application No. PCT/EP00/08930, filed on Sep. 13, 2000.

(30) Foreign Application Priority Data

Sep. 14, 1999 (DE) .......................................... 199 44 004

(51) Int. Cl.⁷ ................................................ G01D 5/34
(52) U.S. Cl. .............................. 250/231.13; 250/231.18
(58) Field of Search .................... 250/231.13, 231.14, 250/231.16, 231.17, 231.18; 341/13; 116/31; 180/446; 701/41

(56) References Cited

U.S. PATENT DOCUMENTS 5,302,820 A    4/1994  Henshaw et al.
5,665,965 A  * 9/1997  Durham, III ........... 250/231.13
5,886,352 A    3/1999  Wright et al.

FOREIGN PATENT DOCUMENTS

| DE | 40 22837 | 1/1992 |
| DE | 4228719 | 3/1994 |
| DE | 42 32 864 A1 | 3/1994 |
| DE | 196 38 912 A1 | 3/1997 |
| DE | 198 04 666 C1 | 2/1998 |

* cited by examiner

Primary Examiner—Kevin Pyo
(74) Attorney, Agent, or Firm—Brooks & Kushman, P.C.

(57) ABSTRACT

An optoelectronic sensor for sensing the angular position of a rotatable device includes an encoder disk and a sensor array. The disk has a coding operable to move along a movement direction in response to rotational device movement. The coding represents an optical oscillation structure extending transversely to the movement direction of the disk and having a frequency-related parameter which varies along the movement direction such that the parameter is indicative of angular position of the device. The array includes transducers for sensing the coding. The array is arranged transversely to the movement direction such that the transducers proportionally sense a respective portion of the coding at each angular device position. The transducers generate an intensity signal indicative of the parameter of a sensed portion of the coding at an angular device position. Based on the intensity signal, the angular device position is determined from the sensed coding portion parameter.

10 Claims, 3 Drawing Sheets

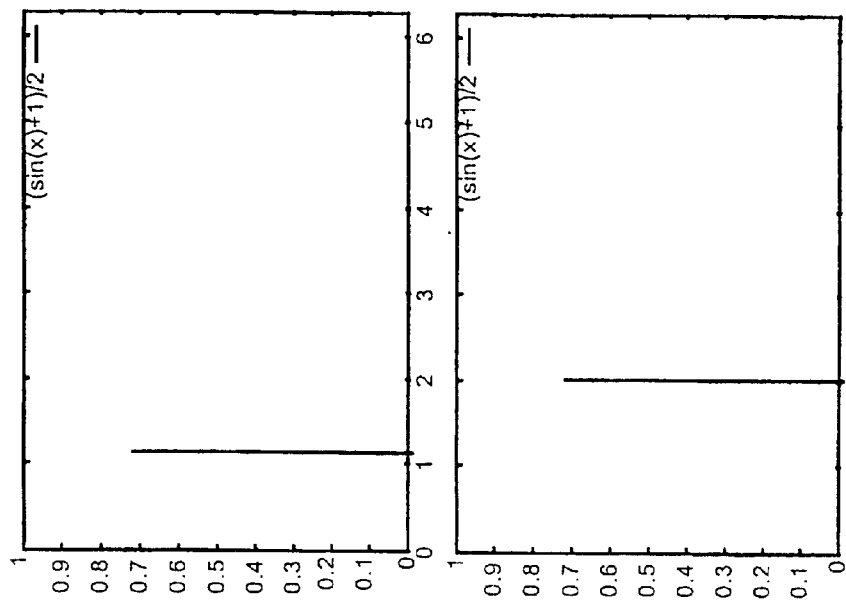
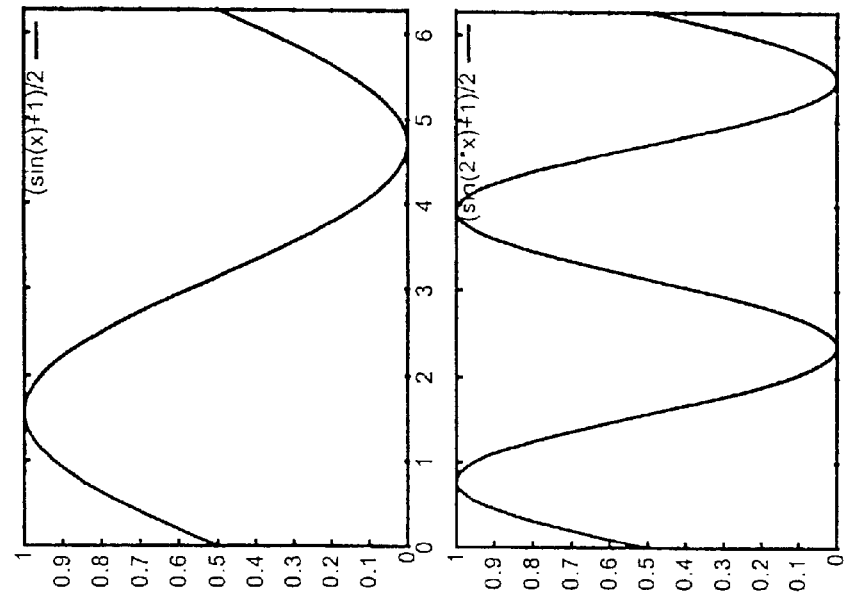

OPTOELECTRONIC ANGLE OF ROTATION SENSOR

CROSS-REFERENCE TO RELATED APPLICATIONS

This is a continuation of International Application PCT/EP00/08930, published in German with an international filing date of Sep. 13, 2000.

BACKGROUND OF THE INVENTION

1. Field of the Invention

The present invention relates to an angle of rotation sensor such as a steering angle sensor. More particularly, the present invention relates to an optoelectronic angle of rotation sensor having an illuminated encoder disk that carries an analog coding and is coupled to the rotational movement of a rotor, and having a sensor array being arranged with respect to its longitudinal direction transversely to the movement direction of the encoder disk, wherein individual transducer elements of the sensor array sense the coding of the encoder disk.

2. Background Art

Angle of rotation sensors are frequently used for automatic positioning processes and measurements in machine tools and coordinate measuring devices. In the automotive industry, angle of rotation sensors are used to determine the absolute angle of rotation of a steering wheel. Sensors of this type are referred to as steering angle sensors. In motor vehicles, the steering angle value may be required for acting upon a dynamic control system. In addition to the steering angle value, a dynamic control system also receives other measurement data such as the rotational speed of the wheels or the rotation of the motor vehicle about its vertical axis. The dynamic control system evaluates the absolute steering angle deflection and the steering speed together with other acquired data for controlling actuators such as brakes and/or for the engine management system.

DE 40 22 837 discloses an optoelectronic steering angle sensor having a light source and a line sensor arranged in parallel at a certain distance from one another. An encoder disk (i.e., code disk) arranged between the light source and the line sensor is connected to the steering spindle to rotate with the steering spindle. In this case, the line sensor is a charge coupled device (CCD) line sensor having transducer elements. An Archimedean spiral extending over 360° realized in the form of a light slit is used as the coding on the code disk. Information on the actual steering angle position is obtained based on the illumination of the corresponding transducer elements of the line sensor at a certain steering deflection.

The Archimedean spiral used as the coding is realized continuously such that the coding represents an analog coding. In this angle of rotation sensor, only a fraction of the transducer elements in the line sensor participate in determining the angular position of the steering wheel. Namely, only the transducer elements that are illuminated through the light slit. The remaining transducer elements of the line sensor participate in evaluation of the angle information only indirectly because the transducer elements that remain dark make it possible to determine only that the angular position of the steering wheel is not located in those angular regions represented by the non-illuminated transducer elements. One problem of such a coding can be seen in that the coding which is realized in the form of a light slit may become contaminated, for example, by debris such as hair, such that detection of the steering angle is no longer possible in this coding region. The contamination sectionally shades the coding and the transducer elements to be illuminated in order to detect this angular position remain dark. Consequently, this angular position is not defined.

SUMMARY OF THE INVENTION

In view of the prior art, it is an object of the present invention to provide an optoelectronic angle of rotation sensor such that a reliable angle determination is possible with partially contaminated coding.

The present invention attains this object as the angle coding reproduced on a sensor array essentially acts upon all sensor array transducer elements such that the angle information sensed by the sensor array is proportionally contained in every transducer element. The angle coding represents the reproduction of an optical oscillation structure on the sensor array extending in the longitudinal direction of the sensor array and changes with respect to at least one parameter in the movement direction of the code disk. A frequency-related analysis of the intensity signal detected by the transducer elements is carried out to decode the optical information detected by the sensor array with respect to the angle information contained therein.

In the angle of rotation sensor according to the present invention, which is suitable as a steering angle sensor for determining the absolute angle of rotation of a steering wheel of a motor vehicle, essentially the entire sensor array formed by the transducer elements is used for determining the respective angle information. The angle information is proportionally contained in every transducer element which participate in the evaluation of the angle information. For example, if the sensor array such as a line sensor has 128 transducer elements the angle information to be sensed is proportionally contained in each of the 128 transducer elements. If a reference track is provided on the encoder disk in addition to an angle coding, one region of the sensor array is reserved for reproducing the reference track. The angle information is then reproduced using the remaining transducer elements of the sensor array.

Determination of the angle coding is possible in instances where individual transducer elements are not illuminated, for example, due to contamination of the encoder disk, and consequently cannot contribute proportional angle information. Determination of the angle coding is possible because it can be assumed that the number of transducer elements remaining dark due to contamination is much smaller than the number of illuminated transducer elements. The number of illuminated transducer elements is, however, sufficiently large for reconstructing the optical oscillation structure to obtain the angle information contained therein.

In order to realize this measurement principle, the coding of the angle of rotation sensor according to the present invention is realized in the form of a reproduction of an oscillation structure in the sense of an optical transmission modulation extending in the longitudinal direction of the sensor array. This optical oscillation structure continuously changes with respect to one of its parameters (such as frequency or phase) in the movement direction of the encoder disk such that an angle detection is possible as a function of change of this parameter. Decoding of the angle information detected by the sensor array and present in the form of an optical oscillation structure preferably takes place in the form of frequency analysis of the amplitude signal progression over all transducer elements.

A frequency analyzer or a phase-lock loop (PLL) may be used to carry out the frequency-related analysis. The frequency analysis itself may be realized in the form of a Fourier transformation such that a spatial frequency spectrum can be assigned to a certain rotor position.

In a preferred embodiment of the present invention, the optical oscillation structure is mono-frequent in any angular position. In order to realize such encoding on an encoder disk, the frequency of the structure may change in the movement direction of the encoder disk. In order to reproduce the oscillation structure on the sensor array, one embodiment of such an angle of rotation sensor contains an encoder disk with a transmission that is sinusoidally modulated in the radial direction. The modulation frequency of the transmission continuously changes in the movement direction and/or the phase position of the transmission changes over the measurement range. This coding, which is reproduced on the sensor array, exhibits a continuous change from bright regions to dark regions that corresponds to the frequency, wherein a continuous transition is also provided with respect to the intensity.

According to another embodiment of the present invention, such an optical oscillation structure may be realized by designing the coding of the encoder disk in the form of a mask having bright and dark strips, wherein this coding is diffusely illuminated to such a degree that the bright/dark transitions of the mask extend over numerous transducer elements. In this case, the edges of the optical oscillation are realized by these transition regions.

BRIEF DESCRIPTION OF THE DRAWINGS

Additional particularly advantageous embodiments of the present invention will be explained using the embodiment example shown in the drawings.

FIG. 2a illustrates the intensity progression of the coding reproduced on the line sensor at an angular position A;

FIG. 2b illustrates the determined frequency spectrum of the optical oscillation structure of the intensity progression shown in FIG. 2a;

FIG. 3a illustrates the intensity progression of the coding reproduced on the line sensor at an angular position B;

FIG. 3b illustrates the determined frequency spectrum of the optical oscillation structure of the intensity progression shown in FIG. 3a;

FIG. 4b illustrates the determined frequency spectrum of the optical oscillation structure of the intensity progression shown in FIG. 4a;

FIG. 5b illustrates the determined frequency spectrum of the optical oscillation structure of the intensity progression shown in FIG. 5a.

DETAILED DESCRIPTION OF THE PREFERRED EMBODIMENT(S)

Figure 1:
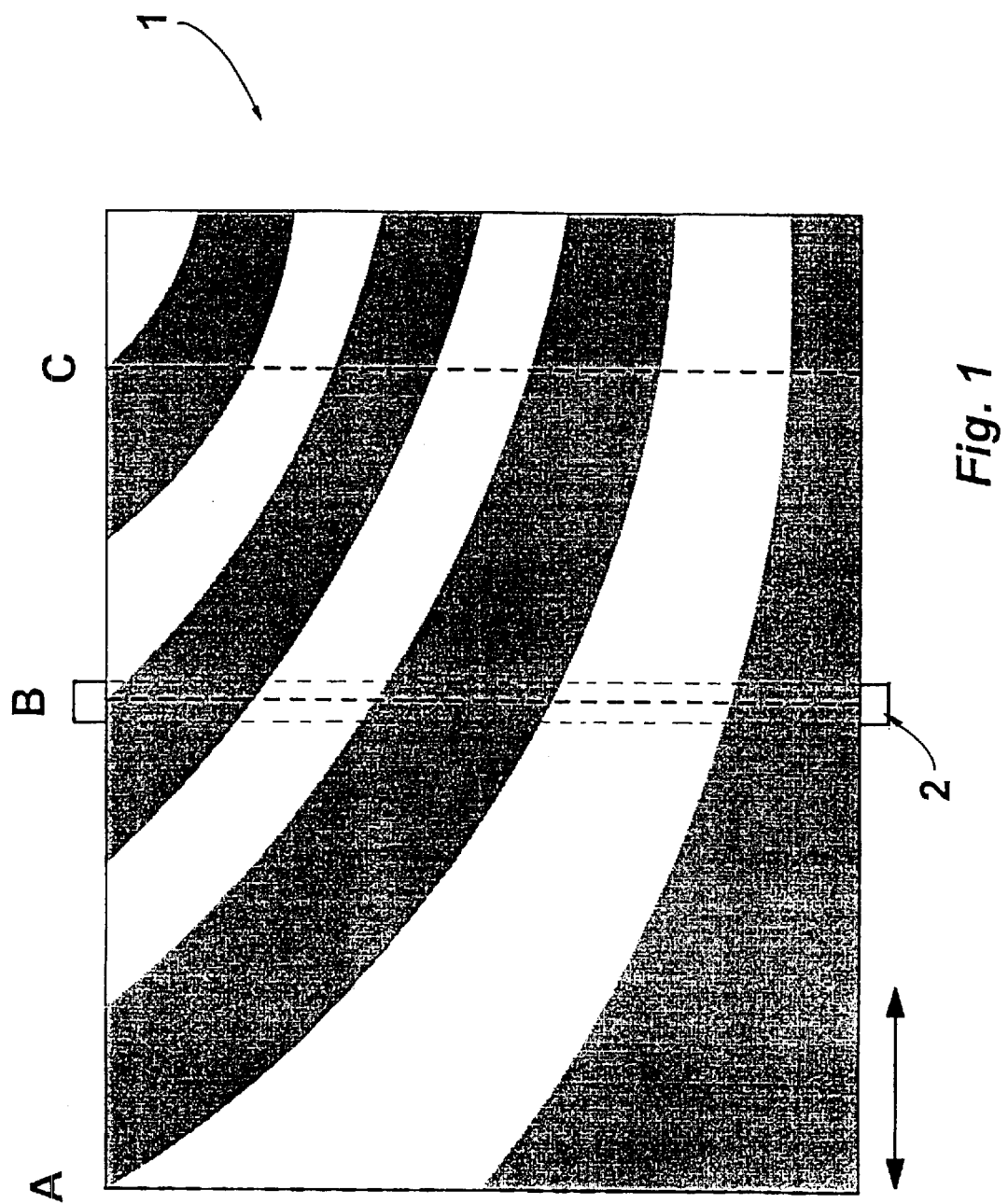
FIG. 1 illustrates an encoder disk for an optoelectronic angle of rotation sensor having an optical oscillation structure extending in the longitudinal direction of a line sensor.

Referring now to FIG. 1, an optoelectronic angle of rotation sensor in accordance with the present invention is shown. The angle of rotation sensor may be used as a steering angle sensor for determining the absolute angle of rotation of a steering wheel of a motor vehicle. The angle of rotation sensor includes an encoder disk 1 which can be translationally moved relative to a rotor (not shown) according to the illustrated double arrow. Encoder disk 1 is coupled to the rotational movement of the rotor, for example, by means of a screw drive. An optoelectronic sensor array, such as a line sensor 2, is arranged on one side of encoder disk 1 such that its longitudinal direction extends transversely to the movement direction of the encoder disk.

The coding of encoder disk 1 includes optical wedges extending transverse to the movement direction of the encoder disk and changing in the movement direction of the encoder disk. These optical wedges can be detected by the photosensitive transducer elements of line sensor 2 in the form of optical oscillations with different intensities. The optical wedges of the coding are illustrated in a simplified fashion in FIG. 1 such that the optical wedge regions with a reproduction intensity lying below an average intensity are shown hatched (i.e., dark), and the regions with a reproduction intensity greater than the average intensity are shown non-hatched (i.e., light). However, the intensity change actually extends continuously.

FIG. 2a illustrates the intensity progression of the coding of encoder disk 1 that is reproduced on line sensor 2 when the encoder disk is situated above the line sensor at the cross-sectional line labeled with reference symbol A. The intensity progression extends continuously similarly to a sinusoidal oscillation. These intensities detected by line sensor 2 in its individual transducer elements are evaluated by means of frequency analysis such that a frequency spectrum can be determined from the individual intensities detected by the transducer elements. The frequency spectrum of the oscillation structure according to FIG. 2a is illustrated in FIG. 2b. Because the coding shown has a mono-frequent coding only one frequency band is subject to a high power density during the frequency analysis.

Figure 4A:
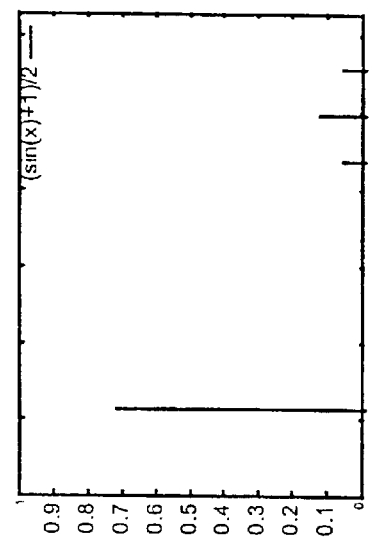
FIG. 4a illustrates the intensity progression of the coding reproduced on the line sensor at an angular position C.
Figure 4B:
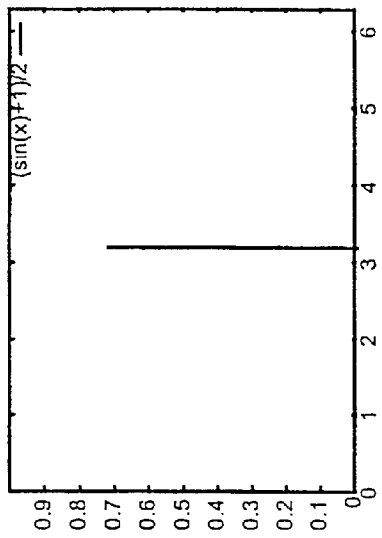

The intensity progressions illustrated in FIGS. 3a and 4a illustrate positions in which encoder disk 1 is situated above line sensor 2 at the cross-sectional lines B (FIG. 3a) and C (FIG. 4a), respectively. The frequency spectrums determined for these intensity progressions are illustrated in FIGS. 3b and 4b, respectively. When using the coding shown, the frequency of the reproduced optical oscillation structure changes in the movement direction of encoder disk 1 relative to line sensor 2. This takes place continuously such that a different intensity progression, and consequently a different result according to the frequency analysis performed for decoding purposes, is obtained at every position of encoder disk 1 relative to line sensor 2.

Figure 5A:
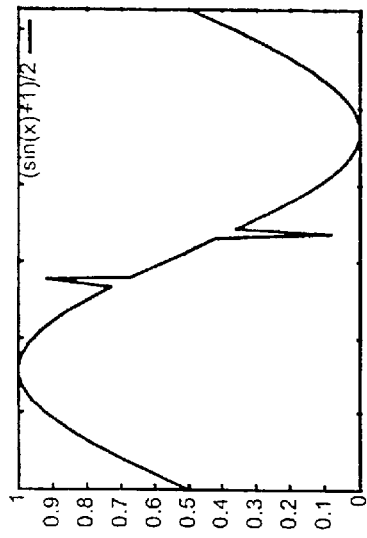
FIG. 5a illustrates the intensity progression reproduced on the line sensor with partially contaminated coding.
Figure 5B:
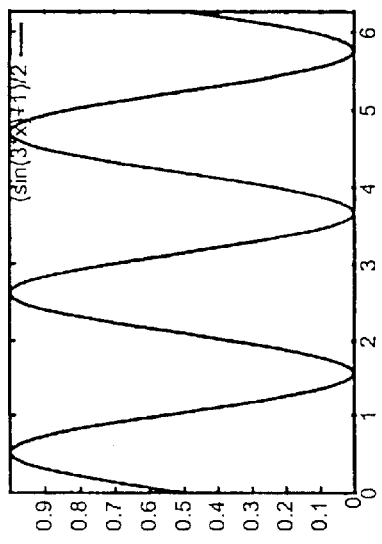

FIG. 5a illustrates the intensity progression corresponding to the cross-sectional line A if a few transducer elements are illuminated differently than intended, for example, due to contamination. In the intensity progression, these illumination errors manifest themselves in the form of the peaks shown as examples. After evaluating this intensity progression as part of a frequency analysis, several frequencies (i.e., a frequency spectrum) result as illustrated in FIG. 5b. However, it is known during the evaluation that coding of encoder disk 1 is realized in a monofrequent fashion. This means that it can already be established that at least to some extent error spectra are also detected during determination of a frequency spectrum with several frequencies. In such a frequency analysis, the respective frequency spectra are reproduced as a function of their detected frequency. Although error spectra were also determined in FIG. 5b, this is the reason that the frequency to be attributed to the coding can be clearly ascertained, as is also the case in FIG. 2b.

The description of the present invention makes it clear that detection of the angle of rotation is not influenced by a contaminated code disk, at least while the majority of the individual transducer elements of line sensor 2 is illuminated with the intensity of the optical oscillation structure.

In the embodiment shown, line sensor 2 moves translationally relative to the rotational movement of the rotor, for example, the steering spindle of a motor vehicle. In another embodiment encoder disk 1 is realized in a circular fashion. In this case, the illustration according to FIG. 1 represents a developed view of the circular code disk. In this case, this developed view may only represent a section of 180° wherein this section is arranged twice adjacent to each another in order to realize the required 360° coding. Accordingly, other angle segments that are repeated an integer number of times during one revolution (360°) may also be represented by such a coding.

In addition to the coding shown in FIG. 1, encoder disk 1 may also contain one or more reference tracks that serve(s) for adjusting the coding and for compensating tolerances in the movement between the coding and the sensor array. The play of a bearing may, in particular, be taken into account by providing a circular encoder disk that is directly coupled to the rotational movement of the rotor.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An optoelectronic angle of rotation sensor comprising:

an encoder having a coding, the encoder being operable to be moved in a movement direction in response to rotational movement of a device, the coding having a plurality of adjacent portions each extending transversely to the movement direction of the encoder from one edge of the coding to the other edge of the coding and aligned across the coding in the movement direction of the encoder, each portion having an optical transmission value which sinusoidally changes as a function of a respective frequency-related parameter from one edge of the coding to the other edge of the coding, wherein the respective frequency-related parameters associated with the portions vary across the coding in the movement direction of the encoder such that the respective frequency-related parameter associated with each portion of the coding is indicative of a respective angular position of the device; and a sensor array having a series of transducer elements for sensing the coding of the encoder, the sensor array arranged transversely to the movement direction of the encoder such that the transducer elements proportionally sense a respective portion of the coding at each angular position of the device, wherein the transducer elements generate an intensity signal indicative of the frequency-related parameter associated with a sensed portion of the coding at an angular position of the device;

wherein a frequency-related analysis of the intensity signal is performed to determine the angular position of the device from the frequency-related parameter associated with the sensed coding portion.

2. The sensor of claim 1 wherein:

the frequency-related parameter is frequency.

3. The sensor of claim 1 wherein:

the frequency-related parameter is phase.

4. The sensor of claim 1 wherein:

the coding includes at least one associated reference track.

5. The sensor of claim 1 wherein:

the frequency-related analysis is performed by a frequency analyzer.

6. The sensor of claim 1 wherein:

the frequency-related analysis is performed by a phase locked-loop.

7. A steering angle sensor for determining the absolute angle of rotation of a steering wheel of a motor vehicle, the sensor comprising:

an encoder having a coding, the encoder being operable to be moved in a movement direction in response to rotational movement of a steering wheel, the coding having a plurality of adjacent portions each extending transversely to the movement direction of the encoder from one edge of the coding to the other edge of the coding and aligned across the coding in the movement direction of the encoder, each portion having an optical transmission value which sinusoidally changes at a respective frequency from one edge of the coding to the other edge of the coding, wherein the respective frequencies associated with the portions vary across the coding in the movement direction of the encoder such that the respective frequency associated with each portion of the coding is indicative of a respective angular position of the steering wheel; and a sensor array having a series of transducer elements for sensing the coding of the encoder, the sensor array arranged transversely to the movement direction of the encoder such that the transducer elements proportionally sense a respective portion of the coding at each angular position of the steering wheel, wherein the transducer elements generate an intensity signal indicative of the frequency associated with a sensed portion of the coding at an angular position of the steering wheel;

wherein a frequency-related analysis of the intensity signal is performed to determine the angular position of the steering wheel from the frequency associated with the sensed coding portion.

8. The sensor of claim 7 wherein:

the coding includes at least one associated reference track.

9. An optoelectronic sensor for sensing angular position of an object, the sensor comprising:

an encoder having a coding, the encoder being operable to be moved in a movement direction in response to rotational movement of an object, the coding having a plurality of adjacent portions each extending transversely to the movement direction of the encoder from one edge of the coding to the other edge of the coding and aligned across the coding in the movement direction of the encoder, each portion having an optical transmission value which sinusoidally changes at a respective frequency from one edge of the coding to the other edge of the coding, wherein the respective frequencies associated with the portions vary across the coding in the movement direction of the encoder such that the respective frequency associated with each portion of the coding corresponds to a respective angular position of the object; and a sensor array having a series of transducer elements for sensing the coding of the encoder, the sensor array arranged transversely to the movement direction of the encoder such that the transducer elements proportionally sense a respective portion of the coding at each angular position of the object, wherein the transducer elements generate an intensity signal indicative of the frequency associated with a sensed portion of the coding at an angular position of the object;

wherein an analysis of the intensity signal is performed to determine the angular position of the object based on the frequency associated with the sensed coding portion.

10. The sensor of claim 9 wherein:

the encoder is a disk.

* * * * *